(12) United States Patent
Ha (10) Patent No.: US 6,315,689 B1
(45) Date of Patent: Nov. 13, 2001

(54) POWER TRANSMITTING DEVICE WITH MULTIPLE OVERDRIVER

(76) Inventor: Tae-Hwan Ha, 11-902 Byeoksan Apt., Hagye Dong, Nowon-Ku, Seoul (KR)

( * ) Notice: Subject to any disclaimer, the term of this patent is extended or adjusted under 35 U.S.C. 154(b) by 0 days.

(21) Appl. No.: 09/476,616

(22) Filed: Dec. 31, 1999

(30) Foreign Application Priority Data

Dec. 31, 1998 (KR) .................................................. 98-63295

(51) Int. Cl.[7] .................................................... F16H 3/72
(52) U.S. Cl. ................................ 475/1; 74/665 B; 74/664
(58) Field of Search ................................ 74/664, 665 A, 74/665 B; 475/1

(56) References Cited

U.S. PATENT DOCUMENTS

| | | | |
|---|---|---|---|
| 663,799 | * 12/1900 | Vaughan | 74/665 A |
| 674,421 | * 5/1901 | Kopp et al. | 74/665 B |
| 948,248 | * 2/1910 | Reaugh | 74/664 |
| 1,306,864 | * 6/1919 | Stoddard | 74/664 |
| 2,653,673 | * 9/1953 | Peterson | 74/664 |
| 4,470,379 | * 9/1984 | Miyakoshi et al. | 74/665 B |
| 4,624,154 | 11/1986 | Kraft et al. . | |
| 5,538,482 | 7/1996 | Tanzer et al. . | |
| 5,868,645 | 2/1999 | Beim et al. . | |
| 5,951,424 | 9/1999 | Briceland . | |

FOREIGN PATENT DOCUMENTS

| | | |
|---|---|---|
| 0 040 994 A2 | 12/1981 | (EP) . |
| 2 618 866 A1 | 2/1989 | (FR) . |

* cited by examiner

*Primary Examiner*—Dirk Wright
(74) *Attorney, Agent, or Firm*—Zarley, McKee, Thomte, Voorhees & Sease (57) ABSTRACT

A clutchless automatic transmission comprises a hyper-overdrive for connecting first and second drive transmitting members, and a planetary transmission for varying the speed and direction of the output shaft with respect to the second drive transmitting member. The planetary transmission includes (1) multiple forward transmitting gearsets for changing the speed transmitted by the second drive transmitting member into a speed ratio of at least three, (2) a backward transmitting gearset for changing the direction of rotation, (3) plural hydraulically driven brake members for selectively braking a carrier of the forward transmitting gearset or a carrier of the backward transmitting gearset, and (4) a transmission lever for driving the brake members based upon an electric signal. The planetary transmission meshes continuously with the input power source without a clutch. The configuration is simple and compact. A speed change can be accomplished easily with an electric signal.

13 Claims, 11 Drawing Sheets

POWER TRANSMITTING DEVICE WITH MULTIPLE OVERDRIVER

BACKGROUND OF THE INVENTION

1. Field of the Invention

This invention relates to a power transmitting device, more particularly, a power transmitting device in which maximal output speed is produced by a planetary transmission and a overdrive which is driven by a power source unit.

2. Prior Art

A conventional power transmitting device employs a plurality of for improving performance of drive power which is generated by a power source.

In general the power is transmitted by the transmitting device for output at optimal speed and torque. It is important to adapt the transmission for the optimal speed and torque.

An example of the transmitting device is a transmission which includes an assembled gearset with a differential gear ratio respectively; the transmission outputs the speed according to a drive power which is output from the power source.

Presently transmissions are manual and automatic transmissions. The automatic transmission objective is to provide output at optimal speed and improve fuel efficiency.

Various attempts have been made to increase the speed ratio produced by the automatic transmission by adding an auxiliary gearset which operates via an initial planetary gearset, multiple gearset, and a last gearset.

The auxiliary gearset is coaxially aligned with an input shaft or a crankshaft of the power source.

An example of such device is disclosed in U.S. Pat. No. 5,538,482, of Tanzer et al. issued on Jul. 23, 1996 which describes a multiple-speed axle mechanism providing overdrive and direct drive. Tanzer increases the speed ratio by using a clutch having first friction elements and a brake means. Thus it can operate in an overdrive mode. Such device has a clutch and brakes adapted to two main axles respectively, so it has a complex structure and only operates in a single overdrive mode.

Another example of the overdrive device is disclosed in U.S. Pat. No. 5,951,424, of Briceland issued on Sep. 14, 1999. Briceland discloses a continuous variable drive transmission. Briceland claims only a simple planetary gearset like the conventional overdrive device. However, it is unsatisfactory because the increase of speed ratio is only 25% which has limited_cl=0 by the formula of Briceland.

Another multiple speed automotive transmission is disclosed in U.S. Pat. No. 5,868,645, of Beim et al. issued on Feb. 9, 1999. Beim discloses a variable multiple speed transmission. Many shafts which driven by a power source, e.g. intermediate shaft, input shaft and output shaft, result in a loss of torque during transmission between the shafts. To regain torque loss of the shafts, a drive clutch is installed. However, this is a conventional manually-operated transmission.

The above disclosures are attempts to improve fuel economy with the transmission and overdriver respectively, which have no reference to the auxiliary device.

THE SUMMARY OF THE INVENTION

It is an object of the present invention to provide a multiple overdrive for increasing the speed of an output shaft.

It is another object of the present invention to provide automatic transmission meshing continuously with gearset to improve an automatic transmission.

It is another object of the present invention to provide a drive transmitting device assembly which is adapted from a power source, a multiple overdrive and a transmission to the output shaft.

The simple structure of the device assembly has special advantages. This device compensates for a loss of torque.

The present invention comprises: a power source unit having an internal combustion engine; a first drive transmitting member for transmitting drive power from the power source unit; a second drive transmitting member having an upper gear and a lower gear for transmitting drive power from the first drive transmitting member; an output shaft for outputting torque and speed from the second drive transmitting member; a hyper-overdrive for connecting the first drive transmitting member and the second drive transmitting member, for hyper-overdriving speed ratio of the output shaft and controlling output drive power which is inputted by the first drive transmitting member; and an transmission for changing the speed from the speed of the second drive transmitting member to the speed of the output shaft, or changing the direction of rotation with or without a speed change, wherein the transmission includes a forward transmitting gearset for changing the speed which is transmitted by the second drive transmitting member into a speed ratio of at least three therein, and a backward transmitting gearset for changing the direction of rotation.

BRIEF DESCRIPTION OF THE DRAWINGS

This invention will be better understood and its various objects and advantages will be more fully appreciated from the following description taken in conjunction with the accompanying drawings, in which.

DETAILED DESCRIPTION OF THE PREFERRED EMBODIMENT

Hereinafter, this invention will be described in detail with reference to the drawings.

Figure 1:
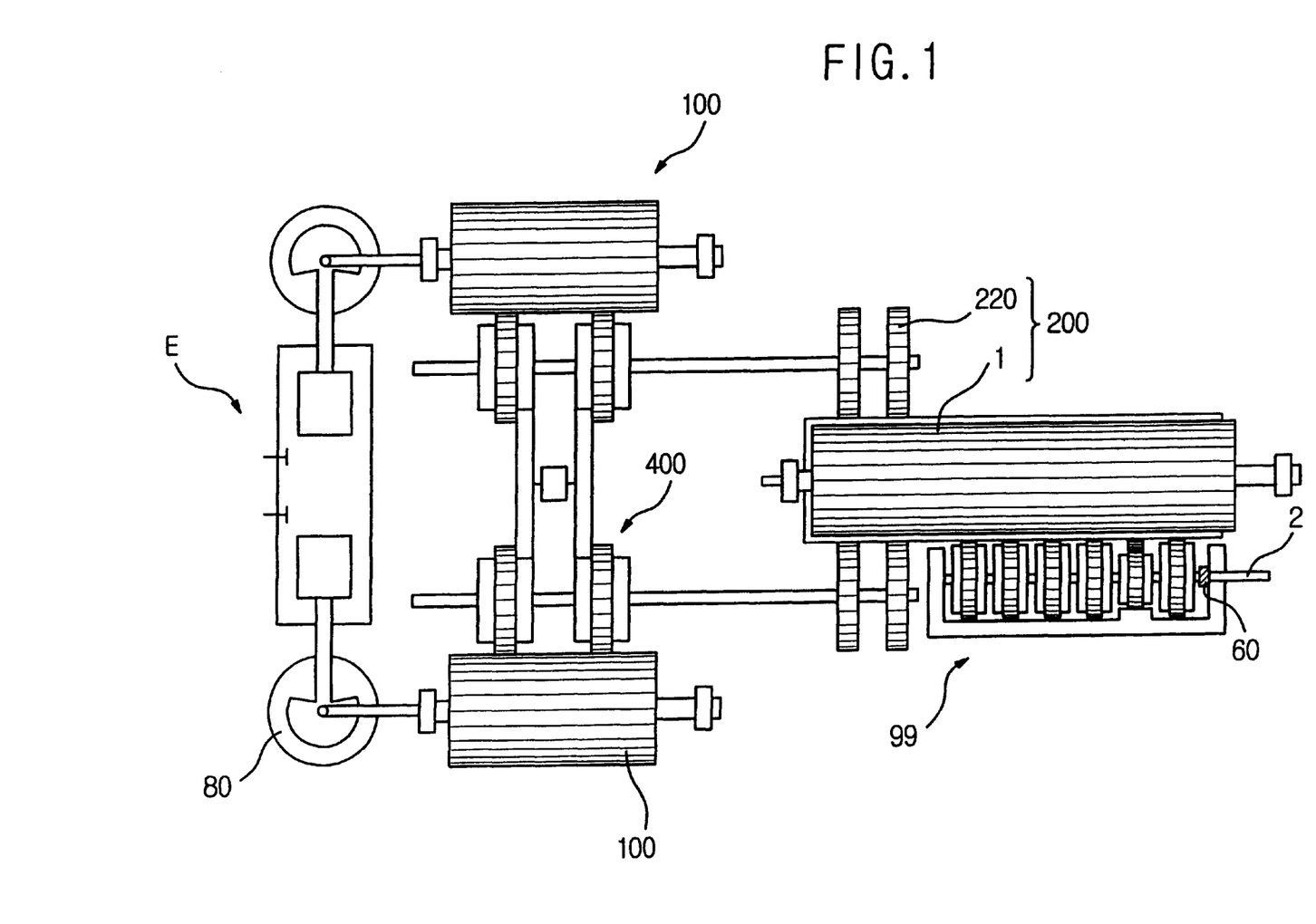
FIG. 1 is a schematic diagram according to the present invention.

Referring to FIG. 1, the power transmitting device with multiple overdrive comprises a power source unit E which has an internal combustion engine 80, a first drive transmitting member 100 for transmitting the drive power from the power source, a second drive transmitting member 200 has an upper gear 220 and a lower gear 1 for transmitting the drive power from the first drive transmitting member 100, an output shaft 2 for outputting the torque and speed by the second drive transmitting member 200, a hyper-overdrive 400 for connecting the first drive transmitting member 100 and the second drive transmitting member 200, for hyper-overdriving speed ratio of the output shaft 2 and controlling output drive power which is inputted by the first drive transmitting member 100 and an automatic transmission 99 meshing continuously with the lower gear 1 of the second drive transmitting member 200 and the output shaft 2, by which the automatic transmission 99 is coaxially aligned by a support bearing member 60.

The first drive transmitting member 100 and second drive transmitting member 200 adapt to a gear or belt. This embodiment describes the gear accordingly.

Figure 2:
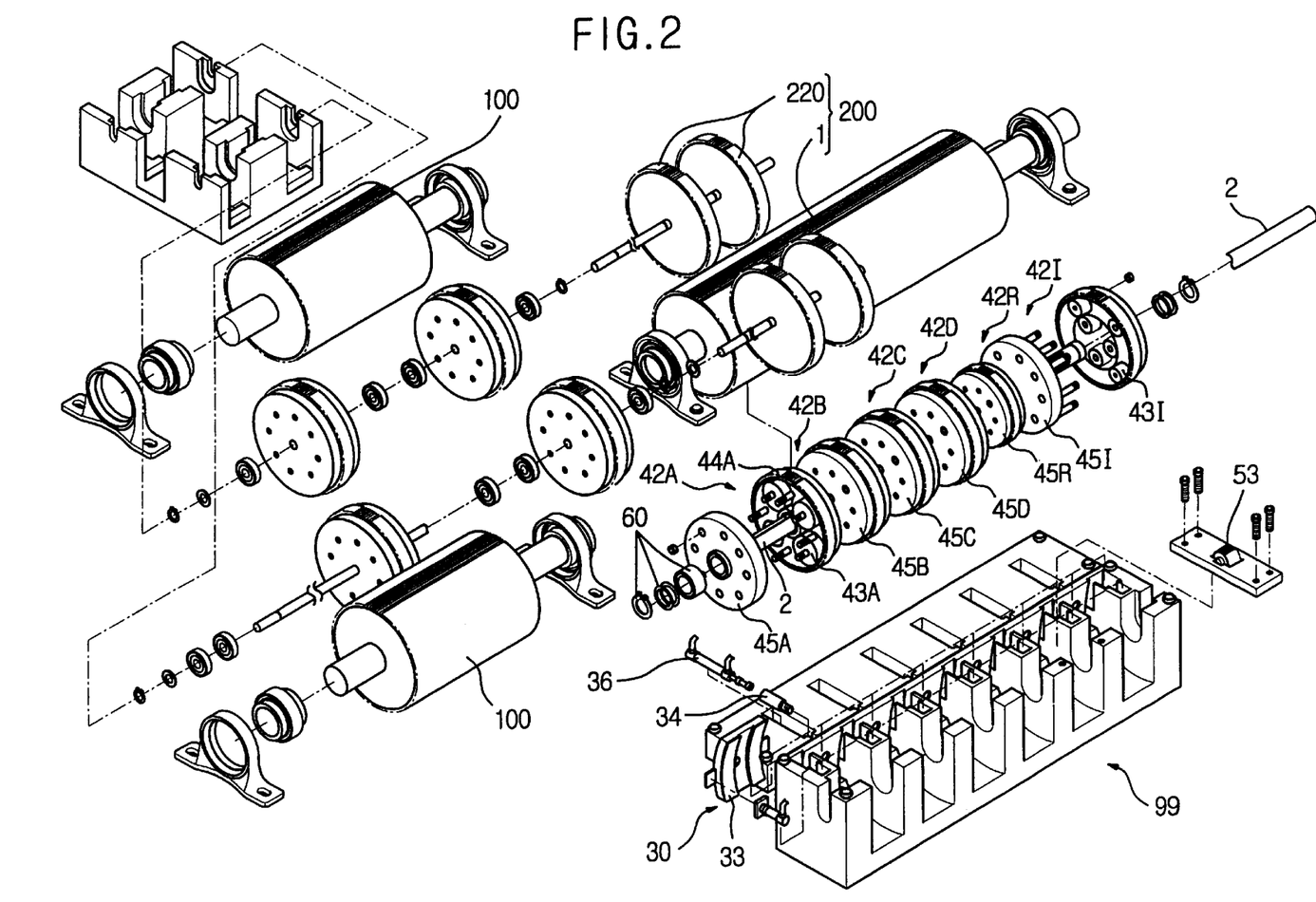
FIG. 2 is a exploded view according to a preferred embodiment of the present invention.
Figure 3A:
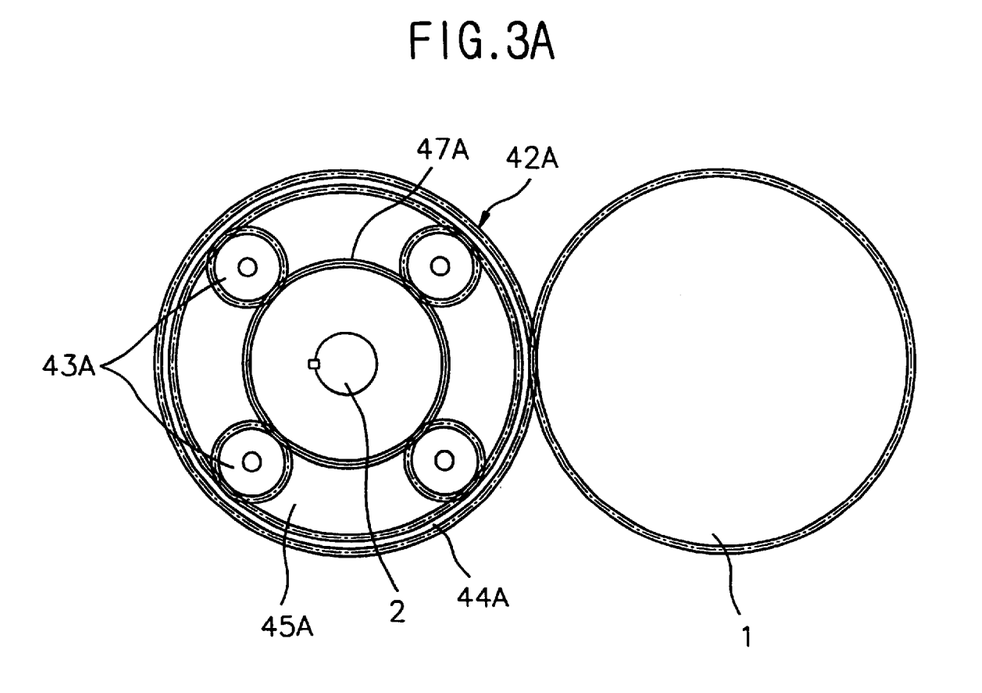
FIGS. 3A to 3F are sectional views of a planetary gearset according to a preferred embodiment of the present invention.
Figure 3B:
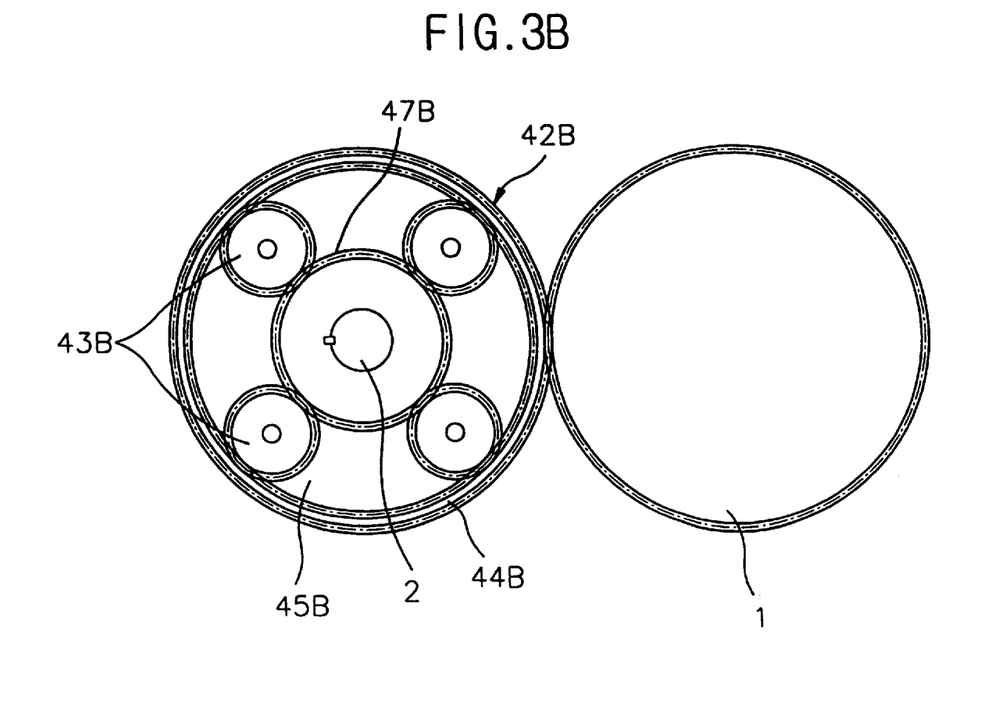
Figure 3C:
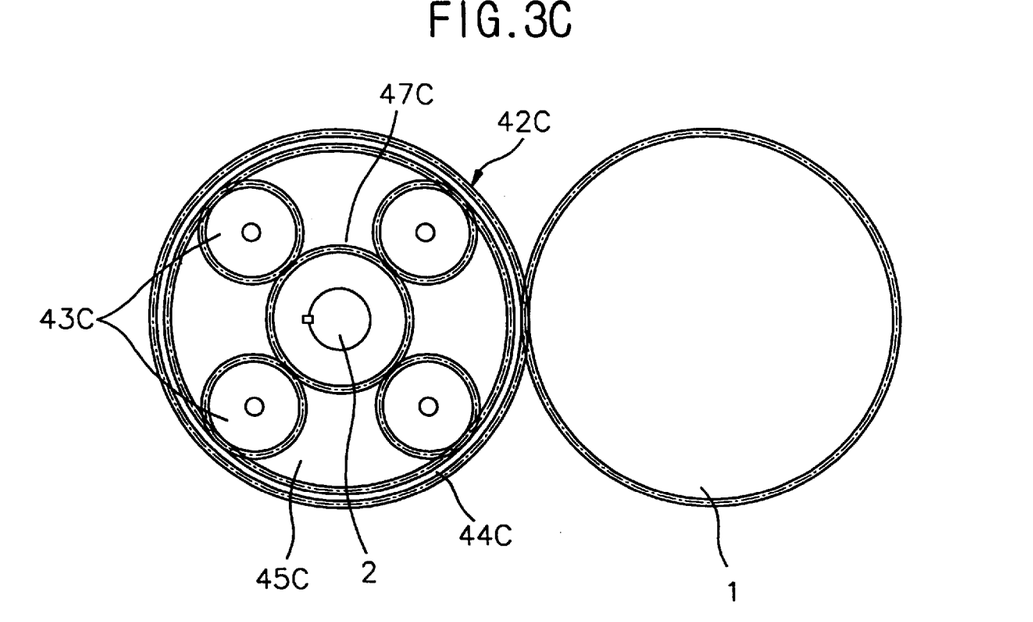
Figure 3D:
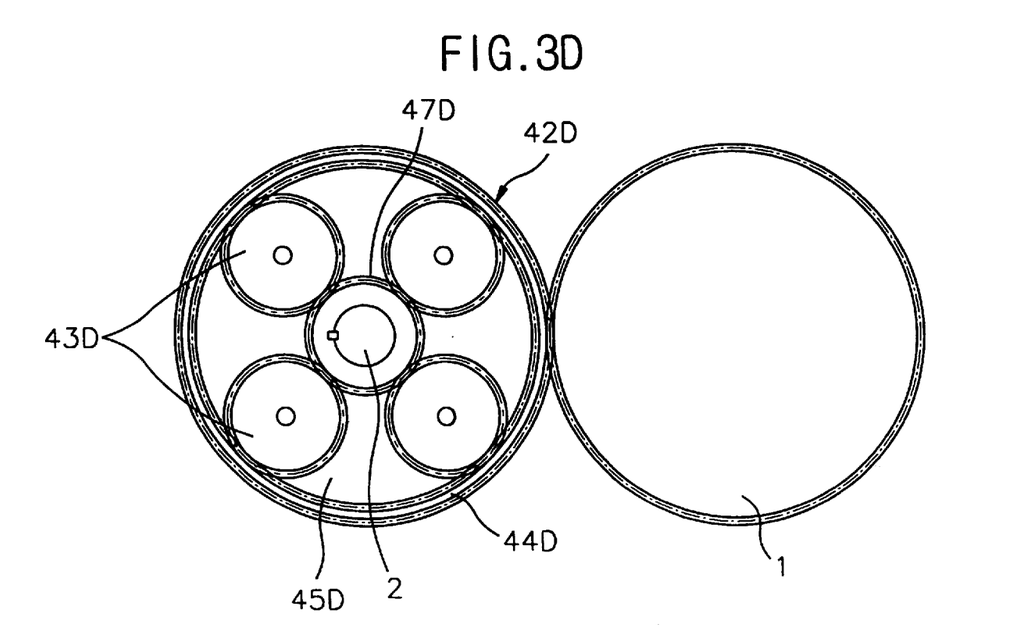
Figure 3E:
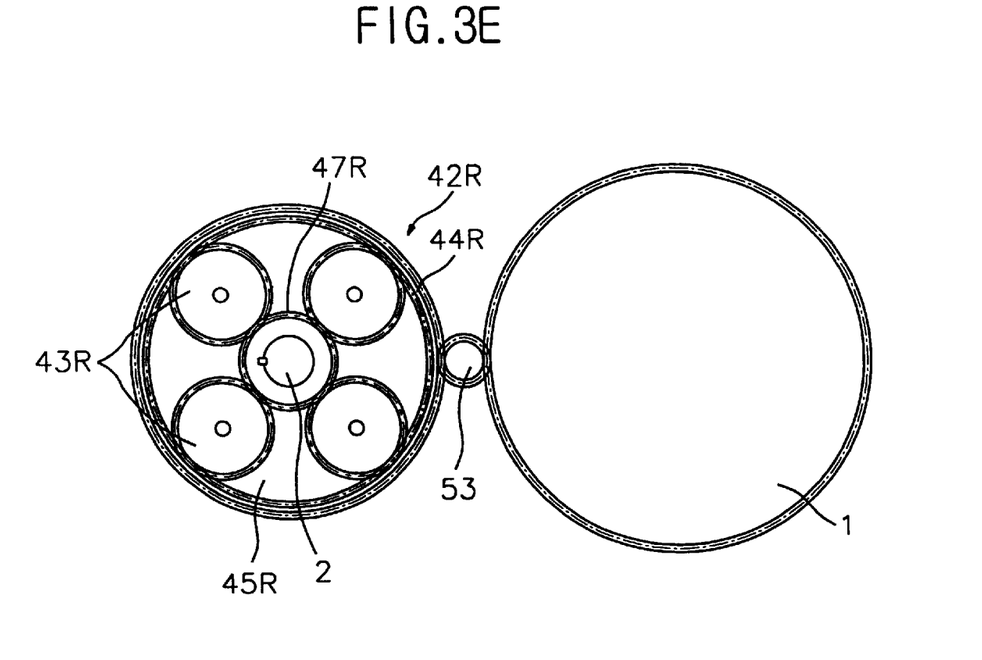
Figure 3F:
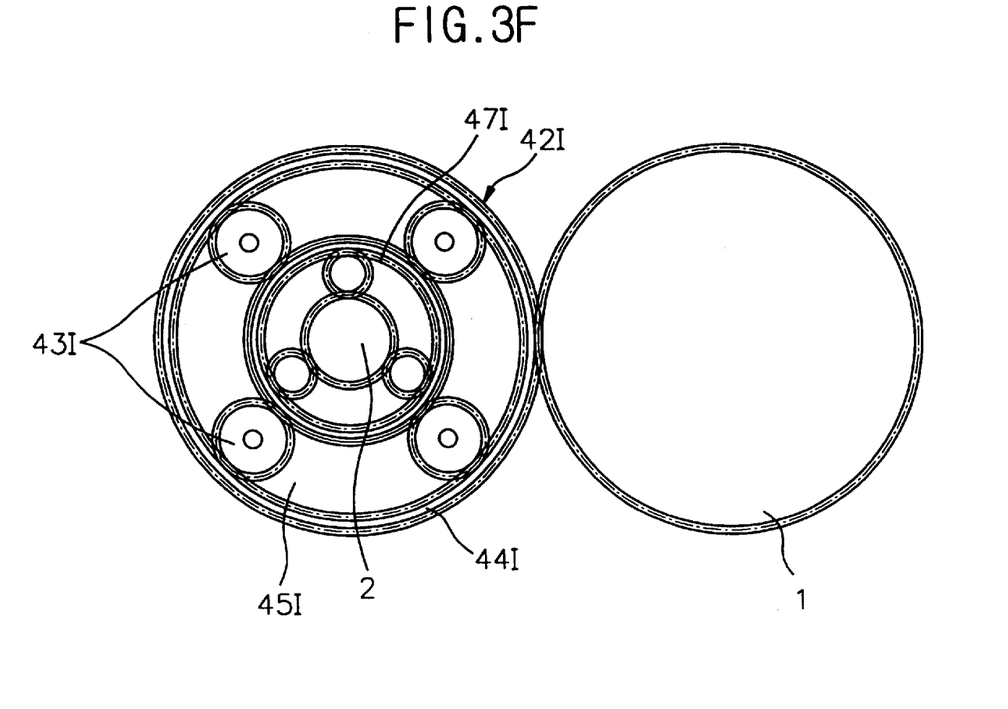

The transmission 99 is in continuous meshing engagement with the lower gear 1 of the second drive transmitting member 200 shown in FIG. 2. The transmission 99 transmits power to the output shaft 2. The transmission 99 has a planetary gear assembly coaxially aligned with the output shaft 2 and supported by the support bearing member 60.

The planetary gear assembly includes a forward transmitting gearset 42A, 42B, 42C, for changing the torque and speed which are transmitted by the second drive transmitting member 200 into a speed ratio at least three therein, a low overdrive gearset 42D to overdrive the speed of the output shaft 2, a backward transmitting gearset 42R having an idle gear 53 for reversing the rotation of the second transmitting member 200, and an overturn gearset 42I for increasing the braking efficiency when the transmission 99 is driven at high speed. The overturn gearset 42I has an inverse gear 43I for inversing direction of the output shaft 2 which only rotates inversely at high speed.

The planetary gear assembly has a different gear ratio respectively and rotates in the same direction shown in FIGS. 3A to 3F. The planetary gear assembly comprises plural sun gears 47A, 47B, 47C, 47D, 47R, 47I(combined as reference NO. 47), plural planetary gearsets 43A, 43B, 43C, 43D, 43R 43I(combined as reference NO. 43), plural ring gears 44A, 44B, 44C, 44D, 44R, 44I(combined as reference NO. 44), and carriers 45A, 45B, 45C, 45D, 45R, 45I (combined as reference NO. 45). Plural sun gears 47 are coaxially aligned with the output shaft 2 and have a different gear ratio respectively. Plural planetary gearsets 43 mesh with an outer face of the sun gears 47 and have a different gear ratio respectively. Plural ring gears 44 form inner teeth meshing with the planetary gearset 43 and outer teeth meshing continuously with the lower gear 1 of the second drive transmitting member 200. The carriers 45 support the planetary gearset 43 and are formed on both sides of the ring gear 44 symmetrically. The forward transmitting gearsets 42A, 42B, 42C has a gear ratio which increases linearly. The low overdrive gearset 42D has a gear ratio which increases non-linearly regarding the forward transmitting gearsets 42A, 42B, 42C. This enables the radius of the sun gears 47 to change linearly and non-linearly. The support bearing member 60 is a one way bearing to increase the brake efficiency.

The carrier 45 brakes via the brake member 30 which transmits the power torque to the output shaft 2.

Figure 4:
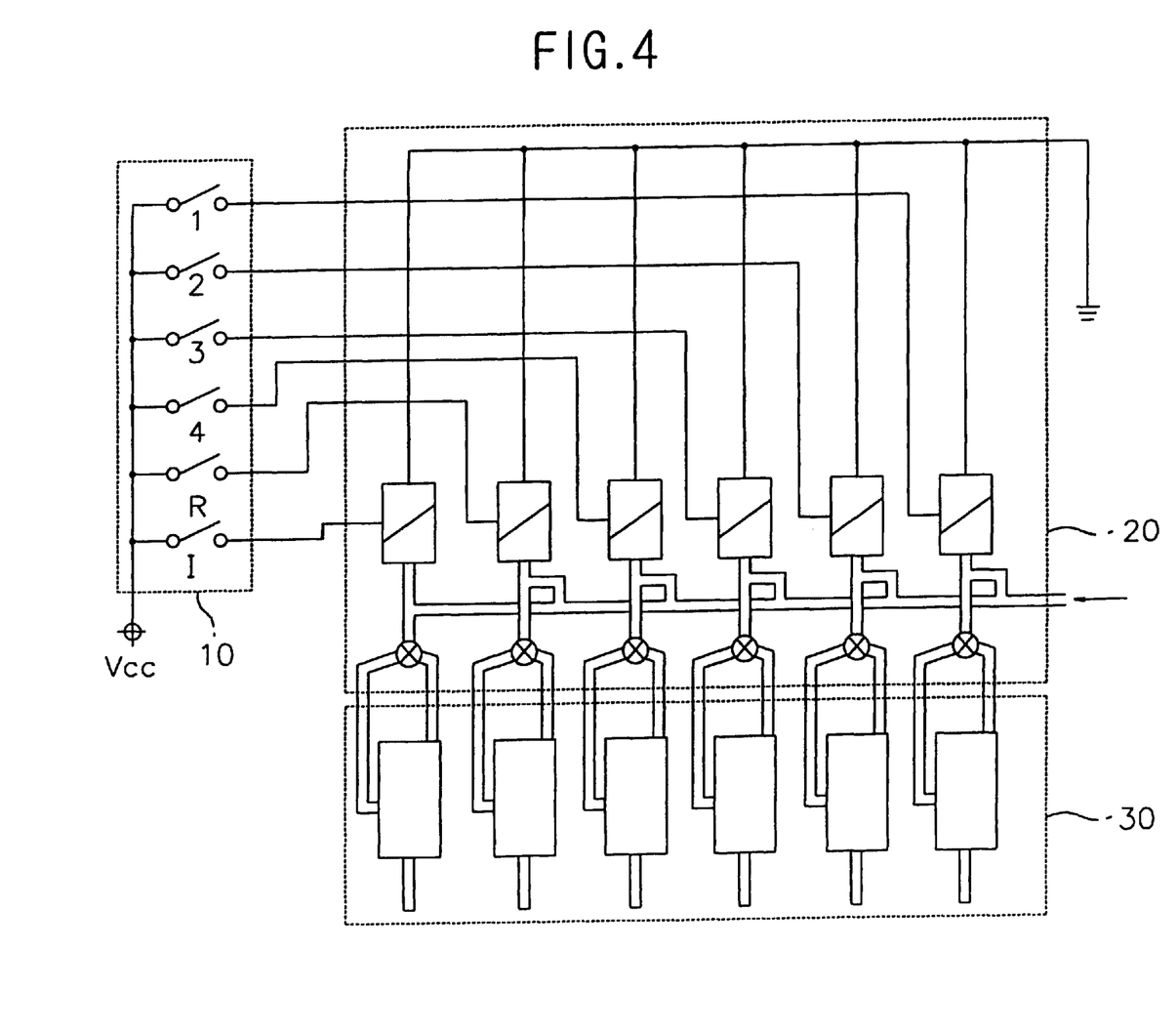
FIG. 4 is a schematic diagram of brake drive according to the present invention.

FIG. 4 is a schematic diagram of the brake member 30 comprising plural brake members 30 to brake the carrier 45, plural hydraulic drive members 20 to drive the brake member 30 selectively, and a transmission lever 10 to drive the hydraulic drive members 20 by an electric signal generated thereby.

Figure 5:
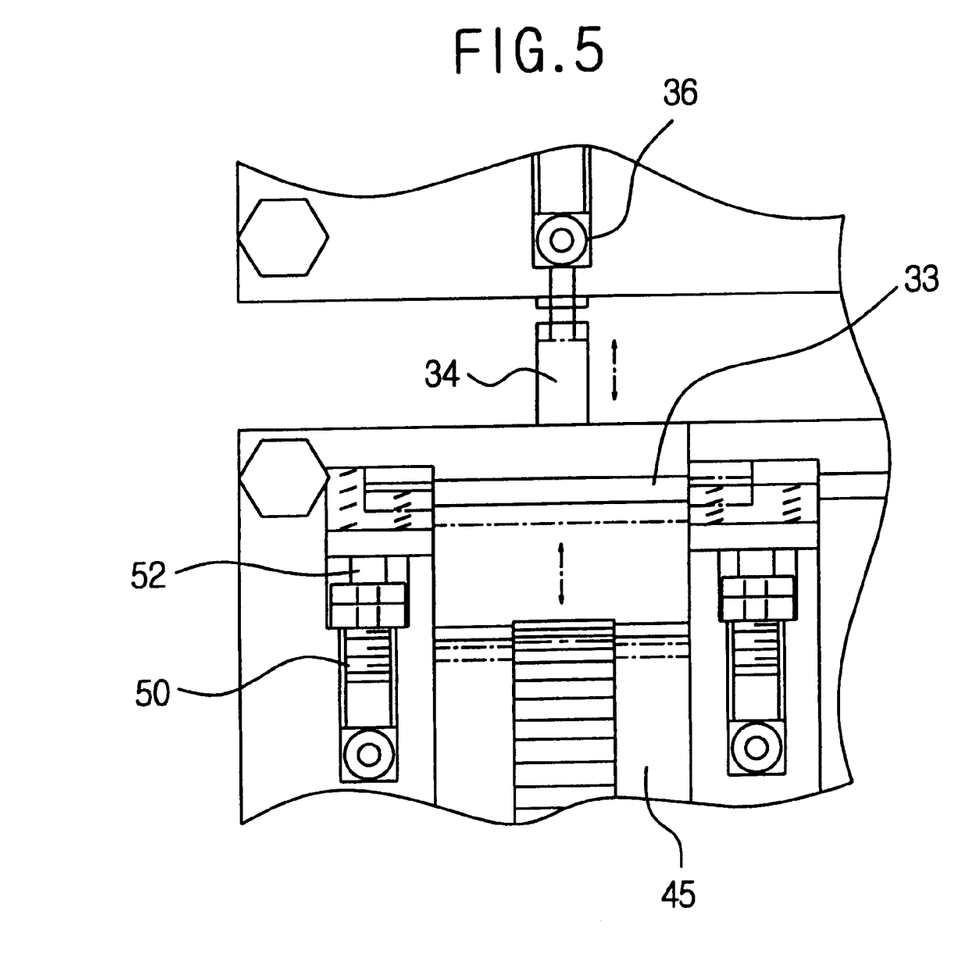
FIG. 5 shows a brake member.

The brake member 30 is shown in FIG. 1 and FIG. 5.

The brake member 30 includes a brake shoe 33 to make contact and cause friction with the outer face of the carrier 45, a push rod 34 to push or pull the brake shoe 33, and a cylinder 36 which is driven by the transmission lever 10 to drive the push rod 34. The brake shoe 33 is shaped like a curvature of the outer face of the carrier 45.

The internal combustion engine 80 of the power source unit E is installed symmetrically at least by two.

Figure 6:
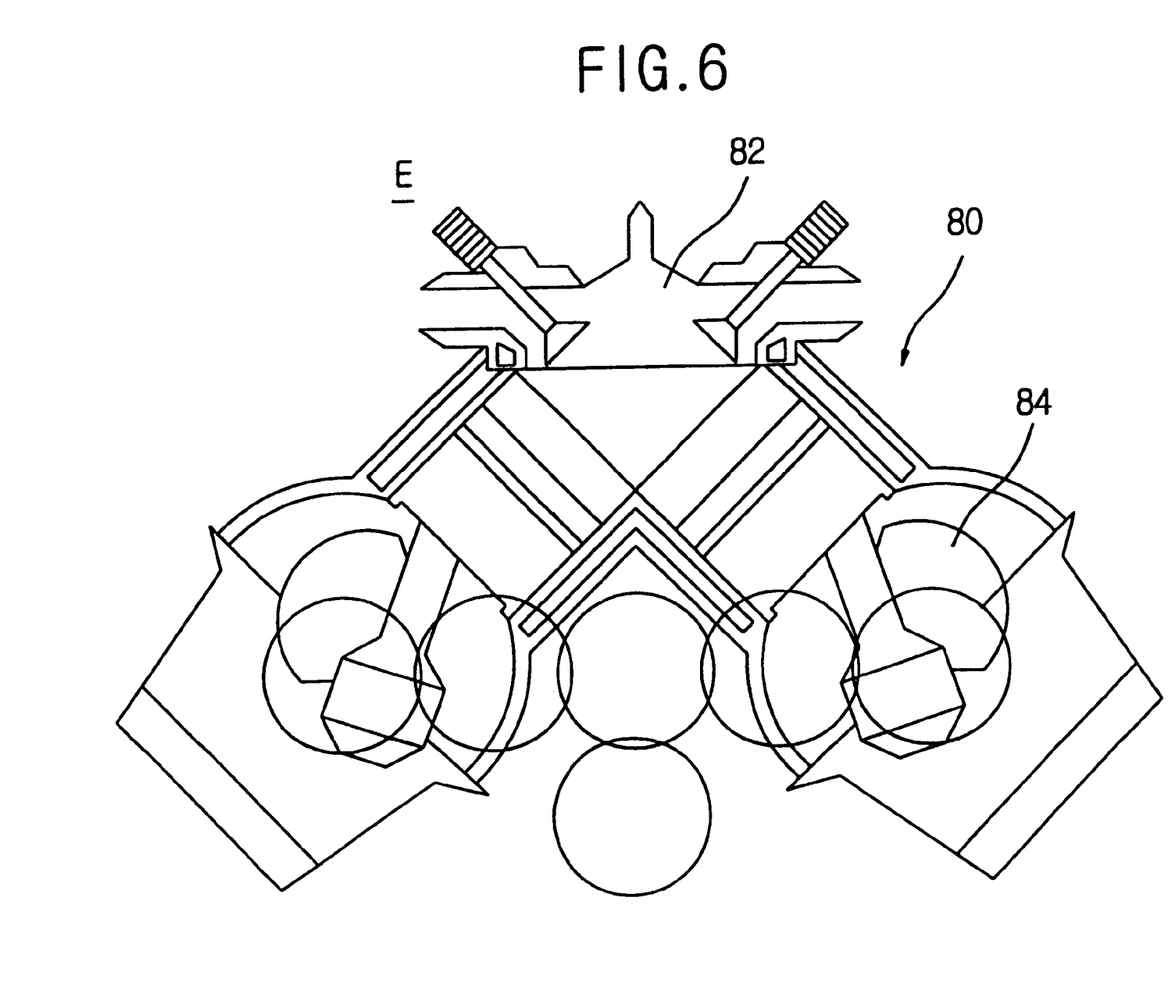
FIG. 6 is a sectional view of an engine according to the present invention.

Referring to FIG. 6, the internal combustion engine 80 is inclined, and a cylinder head 82 of the internal combustion engine 80 is formed integrally, whereas crank shafts 84 are at a distance from each other.

This one-body type engine increases efficiency of the engine.

The hyper-overdrive objective is to hyper-overdrive and drive the output shaft 2.

Figure 7:
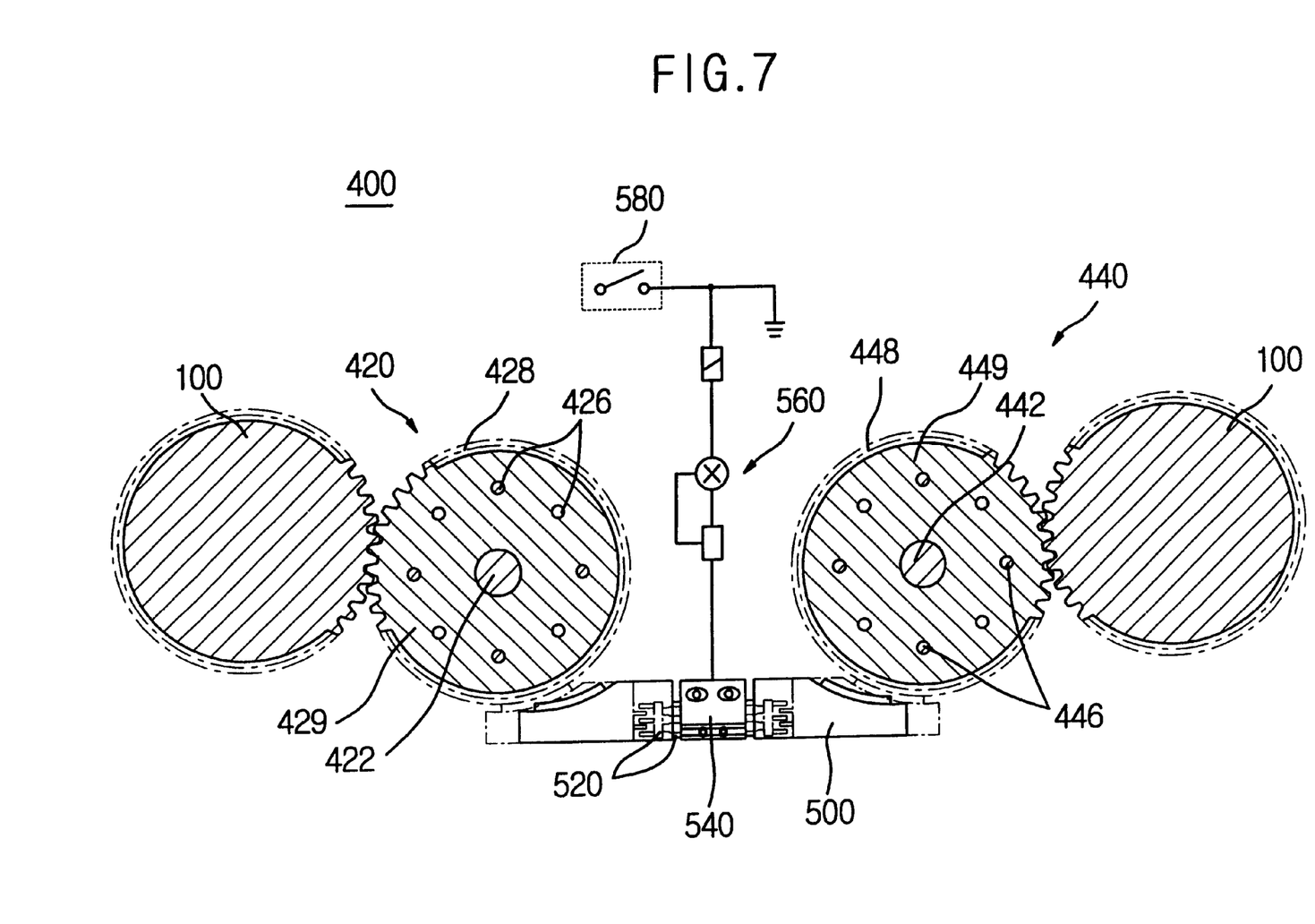
FIG. 7 is a sectional view of a hyper-overdrive according to the present invention.

As shown in FIG. 7, the hyper-overdriver 400 includes a normal gearset 420 having a planetary gear assembly which forms a constant gear ratio and for controlling the driving torque of the first drive transmitting member 100, a high overdrive gearset 440 having a planetary gear assembly which increases non-linearly regarding the low overdrive gearset 42D and to hyper-overdrive the output shaft 2. The normal gearset 420 and the high overdrive gearset 440 comprise sun gears 422,442 coaxially aligned with the upper gear 220 of the second drive transmitting member 200 and having a different gear ratio respectively; a planetary gearset 426,446 meshing with outer face of the sun gears 422,442 and having a different gear ratio respectively; ring gears 428,448 forming inner teeth meshing with the planetary gearset 426,446 and outer teeth meshing continuously with the first drive transmitting member 100; and carriers 429, 449 for supporting the planetary gearset 426,446, whereby the carriers 429,449 are formed on both sides of the ring gears 428,448 symmetrically.

Referring to FIG. 7 a brake bar 500 selects a driving mode in the normal gearset 420 and the high overdrive gearset 440. A crank pin 520 connects with the brake bar 500, a push/pull pressure device 540 connects with the crank pin 520, a hydraulic drive member 560 drives the push/pull pressure device 540, and a select lever 580 generates the electric signal to drive the hydraulic drive member 560 which is driven.

Hereinafter, the operation of the apparatus will be described.

This power transmitting device operates selectively in a normal mode, a low overdrive mode, or a hyper overdrive mode to obtain efficiency for an internal combustion engine 80 as the power source unit E.

The operation of the normal mode will be described below.

The driver selects the optimal mode of the transmission 99.

The first drive transmitting member 100 aligns with the crank shaft 84 and rotates by the power of the internal combustion engine 80, so that the ring gears 428,448 of the hyper-overdrive 400 rotates simultaneously. The brake bar 500 does not brake the ring gears 428,448, so the power torque does not transmit to the second drive transmitting member 200. To produce a normal mode, the brake bar 500 brakes the carrier 429 of the normal gearset 420. The planetary gearset 426 which is aligned with the carrier 429 rotates by the brake of the carrier 429, so the power torque is transmitted to the second drive transmitting member 200. This power torque rotates the ring gears 44 which continuously mesh with the low gear 1 of the second drive transmitting member 200.

If the brake member 30 does not brake the carriers 45 of the automatic transmission 99 when the ring gears 44 rotate, no driving power torque is outputted because the planetary gearsets 43 revolve around the sun gears 47.

As the driver selects the first gear by operating a change lever, the hydraulic drive member 20 is driven thereby. The hydraulic drive member 20 drives the brake member 30 to press the cylinder 36. This pressure of the cylinder 36 pushes the push rod 34, and then the brake shoe 33 which is connected with the push rod 34 contacts carrier 45. When a pad of the brake shoe 33 contacts the outer surface of the carrier 45A the carrier 45A stops rotating. The planetary gearset 43 rotates because the carrier 45A stops, and the power torque is output by the low gear 1 for the second drive transmitting member 200. The automatic transmission 99 is in the first gear.

Figure 8:
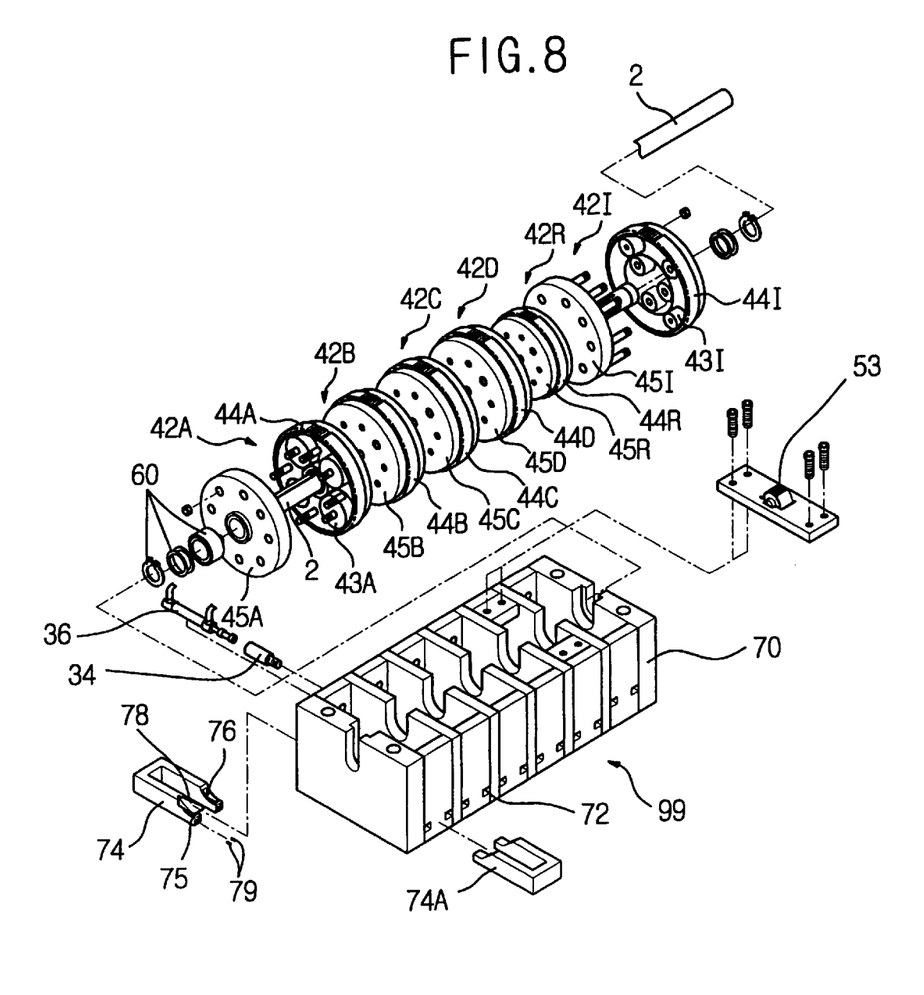
FIG. 8 is a brake member according to another embodiment of the present invention.

Another embodiment of the brake member 30 is shown in FIG. 8. The brake member 30 is symmetrically installed in a lower portion of the carrier 45. The housing 70 which contains the planetary gearset 46 has the penetration hole at both low sides thereof. The symmetrical brake bar 74 is inserted into the penetration hole.

Figure 9:
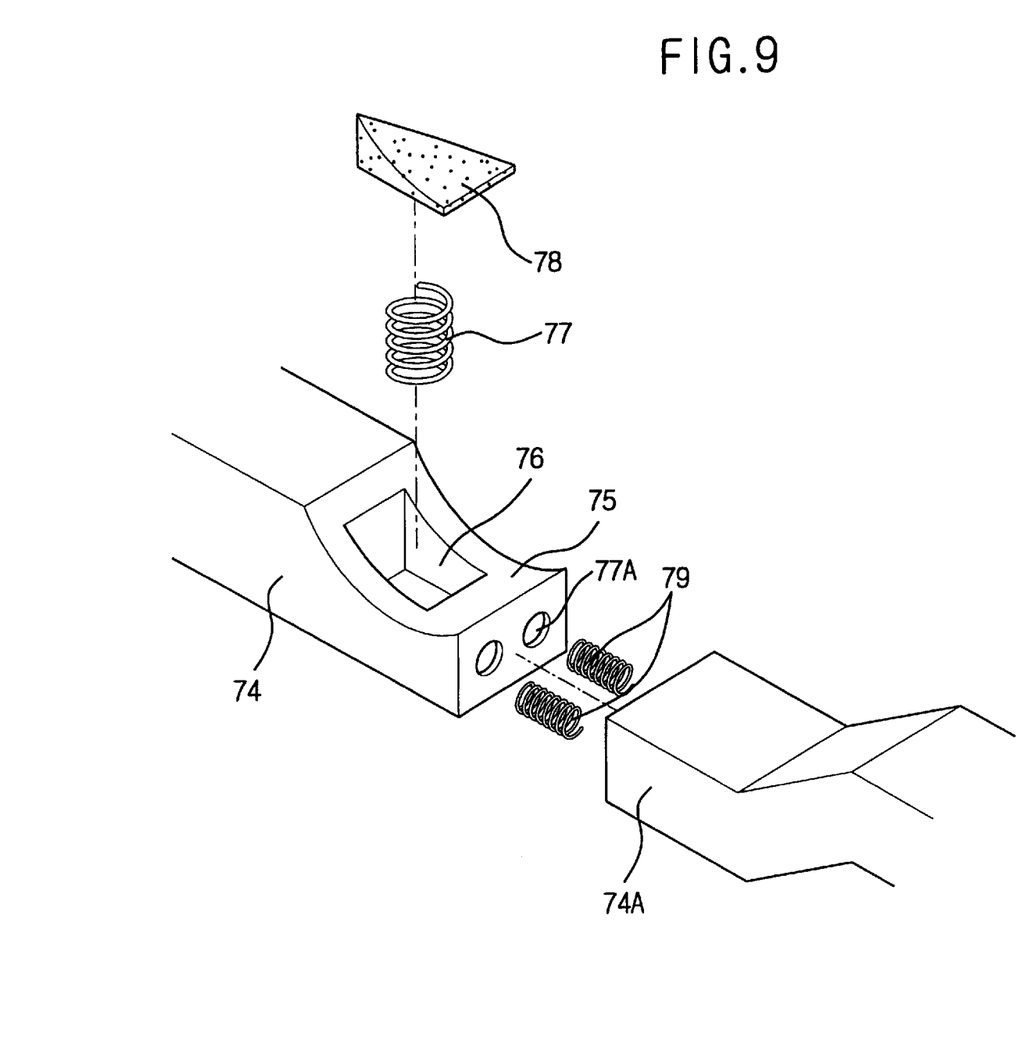
FIG. 9 shows details of FIG. 8.

FIG. 9 shows the end face of the brake bar 74 is formed with a friction part 75 which has the curvature shape of the outer face of the carrier 45. The friction part 75 includes a cave-hollow section 76 which holds an elastic member 77. The upper end side of the elastic member 77 contacts the friction member 78 which is triangular shaped. The elastic member 77 is a rigid spring and the friction member 78 is conventional brake pad.

The end side of the brake bar 74 has a hole 77A for accommodating springs 79. The springs 79 push another brake bar 74A when the carrier 45 contacts the friction member 78. Thus the brake bars 74, 74A push each other toward the wall of the housing 70.

The internal combustion engine 80 operates continuously to increase the power torque, and the speed of the output shaft 2 is limited by the gear ratio of the first gear selected. To increase the speed of the output shaft 2, the transmission lever 10 is put into the 2nd or 3rd gear. Referring to FIG. 5, the brake member 30 is pressed by the electrical signal which is generated by the transmission lever 10, the hydraulic pressure of the brake member 30 releases the pressure of the hydraulic drive member 20 and drives the release member 50. The release member 50 detaches the brake shoe 33 from the carrier 45 by the push member 52, so that the power torque stops resulting in idling.

The transmission lever 10 switched an upper gear idling, and the electrical signal which is generated by the transmission lever 10 drives another hydraulic drive member 20. The other hydraulic drive member 20 drives the other cylinder 36 of the brake member 30, so that the brake member 30 is driven by transmission lever 10.

The upper-lever of the transmission lever 10 operates similarly as above described.

The transmission lever 10 is selected to the low overdrive mode for outputting high speed like overdrive, and the brake member 30 brakes the carrier 45 of the low overdrive gearset 42D. The output shaft 2 rotates at high speed due to the gear ratio which is non-linearly increased with respect to the low gear of the transmission 99. To move in the backward direction, the idle gear 53 is placed between the outer teeth of the ring gear of the backward transmitting gearset and the second drive transmitting member 200.

The backward direction is accomplished by braking the carrier 45R of the backward transmitting gearset. The backward direction is the same as above described.

Hereinafter the hyper-overdrive mode is described.

This mode is selected when the output shaft 2 preferably revolves at 2500 or more revolution per minute(r.p.m.).

The select lever 580 is selected when the power torque transmits within the forward transmitting gearset 42C or low overdrive gearset 42D, and the electrical signal which is generated at the select lever 580 operates to the hydraulic drive member 560. The hydraulic drive member 560 pulls or pushes the push/pull pressure device 540. The operation of the push or pull depends on installation of the push/pull pressure device 540. The brake bar 500 is released on the carrier 429 of the normal gearset 420 and contacts the carrier 449 of the high overdrive gearset 440 to stop. Stopping the carrier 449 of the high overdrive gearset 440 causes the carrier 429 of the normal gearset 420 to rotate, and the planetary gearset 426 of the normal gearset 420 revolves to stop transmission of the power torque into the sun gear 422 of the normal gearset 420.

Simultaneously, the power torque is transmitted by the sun gear 442 of the high overdrive gearset 440 when the planetary gearset 446 of the high overdrive gearset 440 stops. The gear ratio of the sun gear 442 and the planetary gearset 446 increases non-linearly regarding the low overdrive gear, so that the speed of the output shaft 2 is greater than the normal overdrive condition.

Preferably, the hyper-overdrive is driven under low overdrive conditions, so it can be limited under the low overdrive mode.

The overturn gearset 42I of the transmission 99 inverses the rotational direction of the output shaft 2. When this transmission device brakes, the brake member 30 brakes the carrier 45I. Thus the speed of the output shaft 2 reduces rapidly. To increase the braking efficiency, the overturn gearset 42I is driven.

This invention provides an automatic transmission with overdrive. The automatic transmission meshes continuously with the input power source and does not require a clutch, thus the configuration thereof is simple and compact. Also, the power transmitting device according to this invention can be operated by an electric signal, thus a speed change of a vehicle can be accomplished easily.

Furthermore, the hyper-overdrive causes hyper-speed of the output shaft according to the overdrive of the automatic transmission.

While this invention has been particularly shown and described with reference to particular embodiments thereof, it will be understood by those skilled in the art that various changes in form and details may be effected therein without departing from the spirit and scope of the invention as defined by the appended claims.

What is claimed is:

1. A power transmitting device with multiple overdrive comprising:
   (a) a power source unit having an internal combustion engine;
   (b) a first drive transmitting member for transmitting drive power from the power source unit;
   (c) a second drive transmitting member having an upper gear and a lower gear for transmitting drive power from the first drive transmitting member;
   (d) an output shaft for outputting torque and speed from the second drive transmitting member;
   (e) a hyper-overdrive for connecting the first drive transmitting member and the second drive transmitting member, for hyper-overdriving speed ratio of the output shaft and controlling output drive power which is inputted by the first drive transmitting member; and (f) a planetary transmission for varying the speed and direction of the output shaft with respect to the speed of the second drive transmitting member, wherein the planetary transmission includes:
  (1) a forward transmitting gearset for changing the speed which is transmitted by the second drive transmitting member into a speed ratio of at least three therein,
  (2) a backward transmitting gearset for changing the direction of rotation,
  (3) a plurality of brake members for selectively braking a first carrier of the forward transmitting gearset and a second carrier of the backward transmitting gearset,
  (4) a plurality of hydraulic drive members for driving the brake members selectively, and
  (5) a transmission lever for driving the hydraulic drive members by an electric signal which is generated thereby,
wherein the forward transmitting gearset comprises:
  a plurality of first sun gears coaxially aligned with the output shaft by a support bearing member, each of the first sun gears having an outer surface and a different gear ratio respectively,
  a plurality of first planetary gearsets meshing respectively with the outer surface of the first sun gears, each of the first planetary gearsets having a different gear ratio respectively,
  a plurality of first ring gears each having opposite sides, inner teeth thereon meshing respectively with the first planetary gearsets, and outer teeth thereon meshing continuously with the lower gear of the second drive transmitting member, and
  a plurality of first carriers for rotatably supporting the first planetary gearsets, each first carrier extending beyond and being formed symmetrically on both sides of the first ring gear; and
wherein the backward transmitting gearset comprises:
  a second sun gear having an outer surface and being coaxially aligned with the output shaft,
  a second planetary gearset meshing with the outer surface of the second sun gear,
  a second ring gear having opposite sides, inner teeth thereon meshing with the second planetary gearset, and outer teeth thereon meshing continuously with an idle gear,
  the idle gear meshing continuously with the lower gear of the second drive transmitting member, and
  a second carrier for rotatably supporting the second planetary gearset, the second carrier extending beyond and being formed symmetrically on both sides of the second ring gear;
  wherein the power transmission does not require a clutch.

2. The power transmitting device as claimed in claim 1, wherein the internal combustion engine of the power source unit has at least two cylinders arranged symmetrically in a cylinder head.

3. The power transmitting device as claimed in claim 1, the cylinders of the engine are arranged in an inverted V-shaped configuration in a single integral unitary head and include crank shafts located at a distance from each other.

4. The power transmitting device as claimed in claim 1, wherein the forward transmitting gearset has a gear ratio which increases linearly.

5. The power transmitting device as claimed in claim 1, further comprising a low overdrive gearset for overdriving the speed of the output shaft which has a gear ratio which increases non-linearly regarding the forward transmitting gearset.

6. The power transmitting device as claimed in claim 5, in which the low overdrive gearset comprises:
  a third sun gear having an outer surface and being coaxially aligned with the output shaft;
  a third planetary gearset meshing with the outer surface of the third sun gear;
  a third ring gear having opposite sides, inner teeth meshing with the third planetary gearset, and outer teeth meshing continuously with the first drive transmitting member; and
  a third carrier for rotatably supporting the third planetary gearset, the third carrier extending beyond and being formed symmetrically on both sides of the third ring gear.

7. The power transmitting device as claimed in claim 1, wherein the brake member includes:
  a brake shoe for making contact and causing friction with an outer face of one of the first and second carriers;
  a push rod for pushing and pulling the brake shoe; and
  a cylinder which is driven by the transmission lever for driving the push rod.

8. The power transmitting device as claimed in claim 7, wherein the brake has a curvature like a curvature of the outer face of the carrier contacted.

9. The power transmitting device as claimed in claim 1, wherein the brake member includes:
  a brake bar;
  a friction part forming an end side of the brake bar and curvature shaped an outer face of one of the first and second carriers;
  a hollow section within the friction part;
  an elastic member accommodated in the hollow section; and
  a friction member for braking the outer face of one of the first and second carriers and contacting the elastic member.

10. The power transmitting device as claimed in claim 1, wherein the support bearing member is a one-way bearing which rotates in only one direction.

11. The power transmitting device as claimed in claim 1, wherein the hyper-overdrive includes:
  a normal gearset having a planetary gearset which forms a constant gear ratio and for controlling drive power of the first drive transmitting member;
  a high overdrive gearset having a planetary for hyper-overdriving the output shaft;
  a brake bar for selecting a driving mode in the normal gearset and the high overdrive gearset;
  a crank pin connected to the brake bar;
  a push/pull pressure device connected to the crank pin;
  a hydraulic drive member for driving the push/pull pressure device; and
  a select lever for driving the hydraulic drive member by generating an electric signal.

12. The power transmitting device as claimed in claim 11, wherein the high overdrive gearset includes:
  a fourth sun gear coaxially aligned with the upper gear of the second drive transmitting member;
  a fourth planetary gearset meshing with an outer surface of the fourth sun;

a fourth ring gear having opposite sides, inner teeth meshing with the fourth planetary gearset, and outer teeth meshing continuously with the first drive transmitting member; and a fourth carrier for rotatably supporting the fourth planetary gearset, the fourth carrier extending beyond and being formed symmetrically on both sides of the fourth ring gear.

13. A clutchless power transmission with multiple overdrive modes comprising:

a first drive transmitting member for receiving rotary power from a source of rotary power;

a second drive transmitting member including an upper gear continuously meshed with the first drive transmitting member, and a lower gear continuously meshed with the upper gear;

a hyper-overdrive for connecting the first drive transmitting member and the second drive transmitting member so as to selectively vary the drive power transmitted by the first drive transmitting member;

the hyper-overdrive including a normal gearset, a high overdrive gearset, and brake means for selective causing only one of the normal and high overdrive gearsets to drivingly interconnect the first drive transmitting member with the second drive transmitting member with the second drive transmitting member at a given time;

a planetary transmission or gear box having multiple coaxial forward transmitting planetary gearset assemblies with a plurality of different gear ratios so as to define a plurality of speed ranges, at least one backward transmitting planetary gearset assembly for changing direction, and a low overdrive gearset assembly;

an output shaft coaxially driven by the planetary transmission; and a plurality of hydraulic brakes individually actuatable to selectively engage a carrier of one of the gearset assemblies so as to select a desired speed range and direction of output torque;

the planetary transmission being in continuous meshing engagement with the lower gear of the second drive transmitting member and thereby with the source of rotary power through the first drive transmitting member; and wherein no clutch is required in said power transmission.

* * * * *